United States Patent [19]
Loomis et al.

[11] 3,791,310
[45] Feb. 12, 1974

[54] PNEUMATIC SAFETY SYSTEM FOR VEHICLE LADING

[75] Inventors: Russell M. Loomis, Palos Heights; Samuel H. Enochian, Thornton; Gerald R. McLaughlin, Chicago, all of Ill.

[73] Assignee: Unarco Industries, Inc., Chicago, Ill.

[22] Filed: Oct. 28, 1971

[21] Appl. No.: 193,257

[52] U.S. Cl............................ 105/369 BA, 105/376
[51] Int. Cl........................ B60p 7/14, B61d 45/00
[58] Field of Search.......... 105/369 BA, 369 S, 376; 214/10.5 A

[56] References Cited
UNITED STATES PATENTS

| | | | |
|---|---|---|---|
| 3,673,968 | 7/1972 | Bertram | 105/369 BA |
| 3,499,395 | 3/1970 | Val Verde | 105/369 D |
| 3,427,997 | 2/1969 | Brown, Jr. et al. | 105/369 BA |
| 3,073,261 | 1/1963 | Oglesby | 105/376 |
| 3,593,674 | 7/1971 | Winterfeldt | 105/376 |
| 2,798,640 | 7/1957 | Coddington | 105/369 D |

*Primary Examiner*—Drayton E. Hoffman

[57] ABSTRACT

A pneumatic force-absorbing bulkhead system for use in freight carrying vehicles is provided by a central bulkhead with lading-engaging panels disposed on opposite sides of the bulkhead with inflatable envelope means positioned between the bulkhead and each of the panels. Y-shaped linkages between the bulkhead and each panel serve to both support the panel from the bulkhead and permit each panel to pitch independently relative to vertical planes, and means are provided on the bulkhead tending to bias each of the panels toward an inoperative position adjacent the bulkhead. Only a single carriage assembly for the bulkhead supports the entire arrangement including the panels.

12 Claims, 5 Drawing Figures

3,791,310
FIG 1
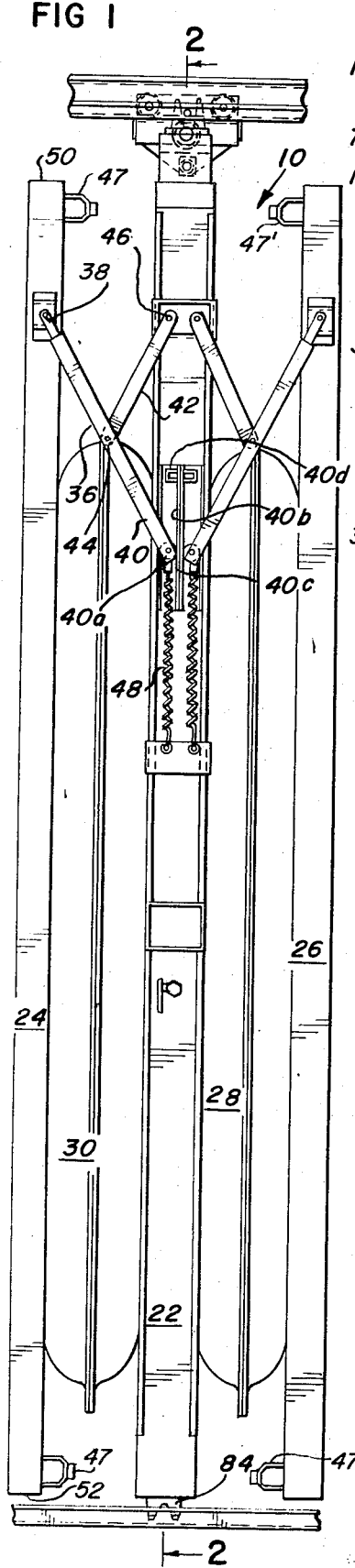
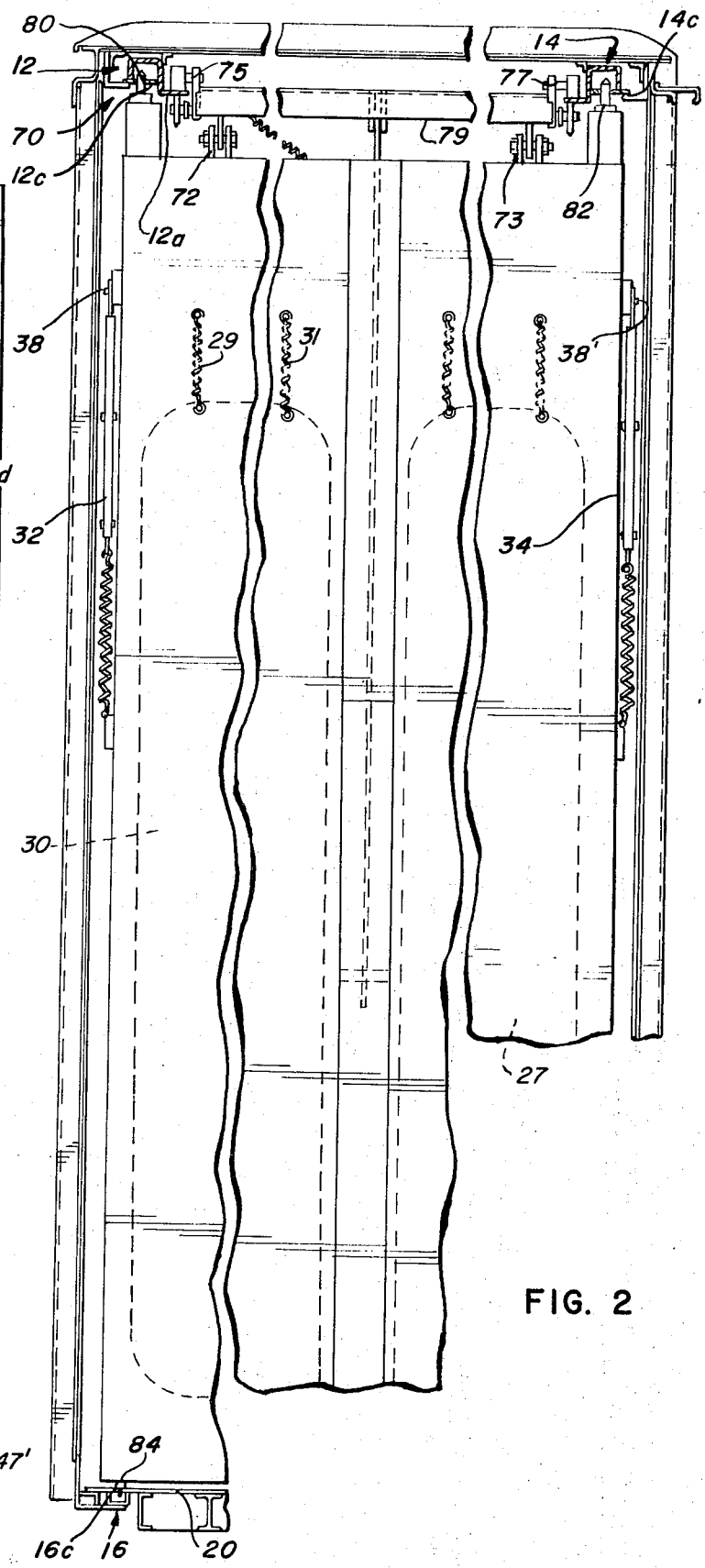
FIG. 2

PNEUMATIC SAFETY SYSTEM FOR VEHICLE LADING

BACKGROUND OF THE INVENTION

This invention relates to a pneumatic force-absorbing bulkhead system for use in railway cars to cushion the shifting of lading in the car during shipment. More particularly the invention relates to the linkage system for supporting and controlling the movement of lading-engaging panels associated with a bulkhead and with inflatable means disposed between the bulkhead and the panels, and also relates to the carriage means for suspending and moving the bulkhead within a lading-carrying vehicle.

Pneumatic force-absorbing bulkhead systems for use in freight carrying vehicles are known in the prior art. Where a bulkhead with lading-engaging panels disposed on both sides of the bulkhead have been used, as in U.S. Pat. No. 3,427,997, the supports for the bulkheads and panels have been complex and represent an expense. Furthermore, the arrangement in said patent limits the panels movement toward and away from the bulkhead only with the panels maintained in vertical planes parallel to the bulkhead. In U.S. Pat No. 3,673,968, dated July 4, 1972, and issued to the Assignee of this application, a simplified linkage between a wall-type member and a lighter panel permits the panel to compensatingly skew sightly relative to the wall and permits the panel to adjust to unevenness of the lading, both vertically and in direction crossway of the width of the vehicle.

In a co-pending application, Ser. No. 193,384, filed Oct. 28, 1971, and assigned to the common assignee of this application, there is disclosed a simplified support and expanding linkage connection between a bulkhead and a lading-engaging panel of a pneumatic force-absorbing bulkhead system.

It is an object of this application to provide an improved pneumatic force-absorbing bulkhead wherein the bulkhead is equipped with a pair of lading-engaging panels that are supported solely from the bulkhead by Y-linkages that permit the panels to independently pitch relative to vertical planes and including improved means effectively located on the bulkhead for separately biasing each panel toward an inoperative, or stored-away position adjacent the bulkhead.

Another object of this invention is to provide a pneumatic force-absorbing bulkhead system that is characterized by simplicity and inexpensiveness of construction, and by effectiveness of operation.

SUMMARY OF THE INVENTION

There is provided by this invention a double cushioning bulkhead system which is suspended from and movable along an overhead track system by means of a carriage connected only to the bulkhead or center support wall of the system. The support wall in turn carries a pair of lading-engaging panels, each of which is independently attached to and supported from the wall by Y-shaped linkages. These linkages permit each panel to independently pivot about a horizontal axis, so as to pitch relative to a vertical plane and to accommodate unevenly stacked layers of lading, and the bias means for restoring the lading-engaging panel to a position adjacent the bulkhead is carried by the bulkhead and operates through the Y-linkages. At least one inflatable envelope is disposed between each of the panels and the bulkhead wall for cushioning the forces applied to the panels by the shifting of the lading and for transmitting some of those forces to the center wall.

BRIEF DESCRIPTION OF THE DRAWINGS

FIG. 1 is a side elevational view of a pneumatic force-absorbing bulkhead system that includes a center support wall, or bulkhead, and a pair of lading-engaging panels supported therefrom by means of Y-shaped linkages that operate to move the panels toward and away from the bulkhead while permitting the panels to pitch;

FIG. 2 is a fragmentary vertical cross-sectional view of the bulkhead system taken substantially along line 2—2 of FIG. 1;

DESCRIPTION OF THE PREFERRED EMBODIMENT

Figure 5:
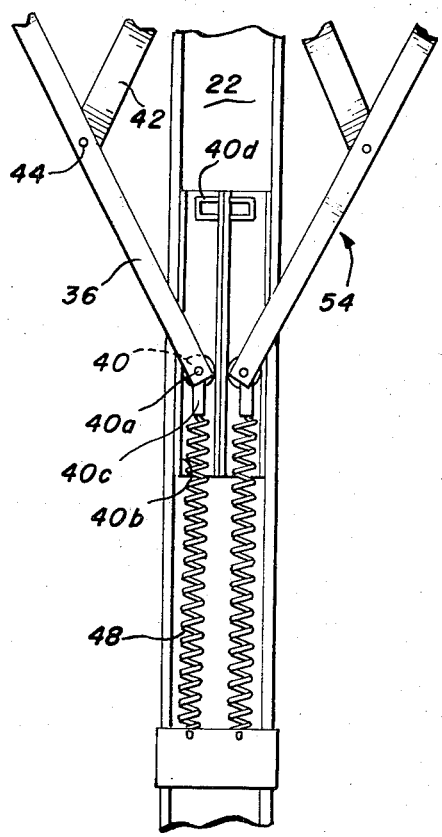
FIG. 5 is an enlarged, fragmentary side view showing details of the slidable connection between an arm of the linkage system and the center bulkhead.

Referring to FIGS. 1 and 2, a cushioning or pneumatic force-absorbing bulkhead system 10, generally is shown. The bulkhead is suspended from and movable along a pair of overhead tracks 12 and 14. Furthermore, the bulkhead may be latchably secured to the overhead tracks, as well known in the art, by a set of lower tracks, such as one shown at 16, recessed in the car floor 20. The entire bulkhead system 10 is movable along the overhead tracks for the entire length of the lading-carrying vehicle.

The bulkhead system 10 includes a center support wall, or bulkhead, 22 to which a pair of lading-engaging panels 24 and 26 are attached. Disposed between and contacting each lading-engaging panel and the center wall are the inflatable envelopes 28 and 30. As seen in FIG. 2 there are two vertically oriented envelopes 27 and 30 disposed between each panel and the center support wall so that in this particular bulkhead system there are a total of four envelopes. These envelopes are hung from the center support wall 22 by means of springs such as 29 and 31.

A pair of identical Y-shaped linkages such as 32 and 34, adjacent the lateral edges of panel 24, connect the lading-engaging panel 24 to the center support wall, as seen in FIGS. 1 and 2, to support the panel 24 from wall 22. The linkage 32 includes a long arm 36 which connects to the wall 22 and the panel 24. One end 38 of the long arm 36 is pivotally connected to an upper side edge of the lading-engaging panel and the other end 40 is pivotally and slidably connected in a track provided on an upper side edge of the center supporting wall 22. A short arm 42, which has an effective length approximately one-half that of the long arm 37, is pivotally connected at one end 46 to an upper side edge of the supporting wall. The other end 44 of the short arm 42 is pivotally connected to long arm 36 at its midpoint or midway between the wall and panel connections. The effective length of the arms is defined as the length between the end pivotal connections of each arm and may approximate the actual length of each arm.

In order to assure proper movement of the panel toward and away from the wall, the slidable end 40 of the long arm 36 must be maintained in engagement with the wall member 22. Desirably, for convenience of construction and effectiveness of operation, the wall, or bulkhead 22, provides thereon the means for maintaining the slidable end of each Y-linkage for panels 24 and 26 in engagement with the bulkhead, and bulkhead 22 also carries the means that normally bias the panels toward the bulkhead.

The slidable end 40 of the Y-linkage is maintained in position by means of a roller 40a which is rotatably mounted to the end 40 of the long arm 36, as seen in FIGS. 1 and 5. The roller is arranged to move vertically within an elongated channel-shaped track 40b which is mounted in the side edge of the center wall 22. A connecting link 40c is provided which connects at one end to the end 40 of said arm and at the other end to the upper end of an elongated, coil tension spring 48 which is anchored at its lower end to a brace provided on the wall 22. The spring 48 tends to pull end 40 downwardly and thus the panel 24 against the envelope 30 toward wall 22. As the envelope is deflated the spring action urges the panel 24 toward an inoperative or stored-away position adjacent, or in close engagement with, the wall 22, and away from the lading-engaging position. Upper and lower bumpers, or spacers, 47 and 47' carried on panels 24 and 26 respectively at each corner thereof serve as abutments that space the panels from the wall 22 to prevent damage to the envelopes 28 and 30, and limit the travel of the panels toward the wall.

The movement of the panels away from the support wall 22 is limited by the roller stop member 40d which is mounted within the track 40b at the top thereof. When the roller engages the stop the further movement of the link end 38 away from the wall is prevented which in turn prevents further movement of the panel 24 away from the wall. The panel 26 operates in similar manner to panel 24 as its mounting and linkages are mirror images of the apparatus described in connection with panel 24.

Geometrically, the arms are arranged such that they form a pair of isosceles-shaped triangles having a common apex at their pivotal interconnection 44. One isosceles triangle is defined by the ends 46, 44 and 40 while the other isosceles triangle is defined by the ends 38, 44 and 46. The length of the imaginary base 38-46 of the triangle 38, 44 and 46 corresponds to the distance between the lading-engaging panel and the support wall. As the panel moves toward or away from the support wall the distance therebetween becomes longer or shorter and the length of the imaginary base 38-46 correspondingly increases or decreases.

As the envelope 30 is inflated, the panel 24 is pushed toward the lading and away from the center support wall. As this occurs the slidable linkage end 40 moves upwardly along the wall 22 toward the ceiling and the imaginary base 40-46 becomes smaller. Viewed in another way the imaginary base 40-46 decreases and the base 38-46 increases as the panel moves away from the wall and the envelope inflates.

Each panel is connected to the center wall by a pair of linkages such as 32 and 34 positioned at opposite side edges. These linkages permit the panel 24 to pivot about a substantially horizontal axis defined by the connection 38 at the end of the long arm 36 in the linkage system 32 generally, and the corresponding end 38' in the linkage system 34. Viewed in FIG. 2 this permits the panel 24 to pivot or swing about the axis defined as 38-38'. Thus the panel 24 can accommodate itself to an uneven end face of a stacked lading.

The linkages as disclosed herein maintain the movement of the upper and lower edges 50 and 52 of the panel 24 in planes substantially at right angles with the center supporting wall 22 and parallel to the ceiling or floor; thereby assuring uniform spacing between the top and bottom panel edges and floor and ceiling as the panels move toward and away from the support wall. These linkages also carry the entire weight of their respective panels and thus eliminate the need to support the lading-engaging panels from a ceiling track or on the floor.

As can be seen in FIG. 1, similar Y-shaped linkages such as 54 are provided to attach the panel 26 to the center support wall 22.

The bulkhead 10 shown in FIGS. 1 and 2 is suspended from the ceiling tracks 12 and 14 by a laterally extending carriage 70 generally to which the center wall 22 is pivotally connected by the clevises 72 and 73. The carriage 70 includes journal blocks 75 and 77 which are mounted to the ends of a laterally extending channel member 79. One end of each clevis is secured to the channel 79 while the other end of each clevis is secured to the top edge of the center wall 22.

Figure 3:
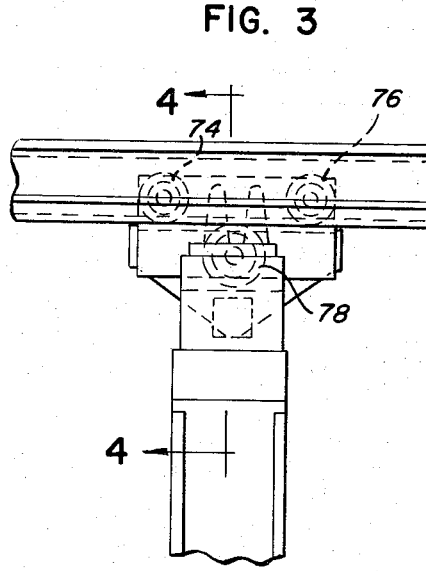
FIG. 3 is an enlarged side sectional view showing a portion of the support carriage for the bulkhead system.
Figure 4:
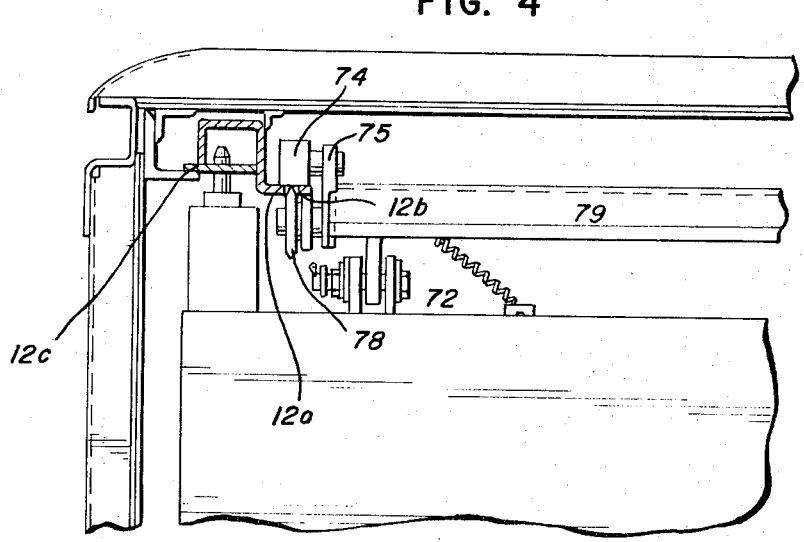
FIG. 4 is an enlarged, fragmentary, cross-sectional view taken substantially along line 4—4 of FIG. 3, and showing details of the support carriage mechanism.

Referring to FIGS. 3 and 4, a pair of spaced support rollers 74 and 76 are journaled to the block 75 and engage and ride upon the upper surface of the track flange 12a; a similar set of rollers are journaled to the block 77. A drive gear 78 whose center is aligned with the center of the supporting wall 22 is mounted to the journal block 75 at a position centered between the rollers 74 and 76 and below the track flange 12a but in a position to engage a plurality of drive apertures such as 12b provided in the track flange 12a. The gear 78 when driven, by a chain drive apparatus as known in the art, moves the entire bulkhead 10 longitudinally within the car.

The entire load resulting from the weight of the wall, the panels, and the envelopes, are directed downwardly through the clevises on the track through the rollers such as 74 and 76 whether the load is axially downward or if it has a torque component. Thus, the rollers will not "cock" and the load will be evenly distributed on the rollers. In order to move the bulkhead 10 within the car the latch pins located at the corners of the bulkhead (such as 80, 82 and 84) are disengaged from their respective locking tracks such as 12c, 14c and 16c, and the bulkhead is driven along its track. Once the bulkhead is positioned the latch pins are re-engaged with their respective tracks and the envelopes inflated so as to push the lading-engaging panels into engagement with the lading for shipment.

It will be appreciated that numerous changes and modifications can be made to the embodiment shown herein without departing from the spirit and scope of this invention.

What we claim and desire to secure by Letters Patent of the United States is:

1. In a load cushioning system for freight-carrying vehicles of the type wherein there is provided a center wall, a pair of lading-engaging panels disposed on opposite sides of said center wall and being attached thereto, inflatable envelope means disposed between each panel and the center wall so that spacing of each panel from the center wall may be controlled by inflation of an adjacent envelope means, and means for suspending and supporting said load-cushioning system from overhead track means, the improvement comprising, in combination: linkage means and spring means positioned laterally outwardly of each panel and associate envelope means, but adjacent to both lateral edges of each panel for controlling movement of the edges of the panel independently toward and away from the center wall, the linkage means being secured to the center wall and providing the sole support for each panel, the linkage means for each panel including a plurality of Y-shaped linkages for mounting the panel to said center wall and for permitting the bottom edge of said panel to swing about a substantially horizontal axis, each Y-shaped linkage being independently operable and comprising a short arm and a long arm with one end of the short arm pivotally mounted to the long arm at substantially the midpoint thereof, and the other end of the short arm being pivotally mounted to said center wall, the long arm having one end pivotally mounted to the panel and the other end slidably engaging said center wall, the pivot connection of the long arm to the panel providing the substantially horizontal axis about which the bottom edge of the panel swings, and spring means operative to normally bias each edge of the panel independently toward the center wall.

2. A device as in claim 1 wherein the other end of the long arm of the linkage carries a roller, and the center wall provides an elongated recess, bounded along opposite sides at the edge of the center wall and within which the roller is received to provide an operative, lost motion, connection between the linkage and the center wall.

3. A device as in claim 1 wherein the spring means for each panel is secured at one end to the center wall and operatively connected at its other end to the linkage associated with the panel.

4. A device as in claim 2 wherein the recesses for the roller portions of the Y-shaped linkages for both panels are arranged in adjacent mirror image relation to each other on the center wall.

5. A device as in claim 2 wherein a stop is provided at one end of the elongated recess for limiting movement of the panel away from the center wall.

6. In a load-cushioning system for freight-carrying vehicles of the type wherein there is provided a center wall, a pair of lading-engaging panels disposed on opposite sides of said center wall and being attached thereto, inflatable envelope means disposed between each panel and the center wall so that spacing of each panel from the center wall may be controlled by inflation of an adjacent envelope means, and means for suspending and supporting said load-cushioning system from overhead track means, the improvement comprising, in combination: linkage means operatively connecting the center wall and each panel and providing for pivoting of each panel relative to its associated linkage means and for the upright edges of each panel being independently operable in movement toward and away from the center wall, abutment means on the center wall for receiving thereagainst, on opposite sides thereof, any moment forces developed by reason of the pivotal support of the panels on the linkage means at points spaced from the center wall, and a support for said load-cushioning system consisting of carriage means connected only to the center wall and adapted for support by overhead track means.

7. A system as in claim 6 wherein the abutment means is part of track means that slidingly receives therein roller means carried by the linkage means.

8. A system as in claim 6 wherein the connection between the carriage means and the center wall permits pivoting of the entire load cushioning system thereat.

9. A system as in claim 8 wherein said carriage means includes a pair of laterally spaced journal blocks and each block having a pair of spaced rollers journaled thereto and arranged to engage the upper surface of said overhead track means.

10. A system as in claim 9 wherein the center wall is substantially centered midway between said rollers.

11. A system as in claim 9 wherein gear-like drive means are also journaled to said blocks, said gear means arranged to engage cooperating drive apertures provided in said track means.

12. A system as in claim 11 wherein said drive gear is substantially centered midway between said rollers.

* * * * *